(No Model.)
N. MOORE.
NON-FRICTION JOINT.
No. 576,221. Patented Feb. 2, 1897.
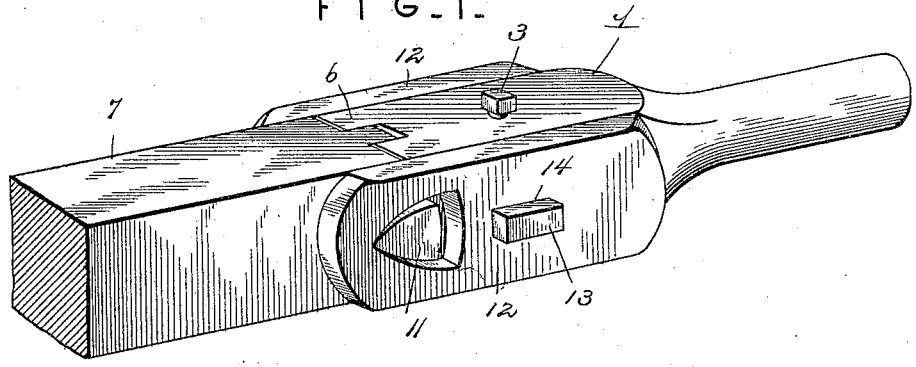
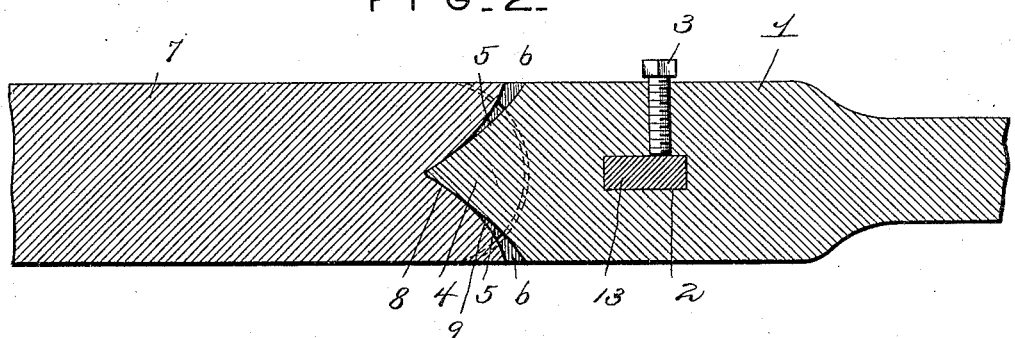
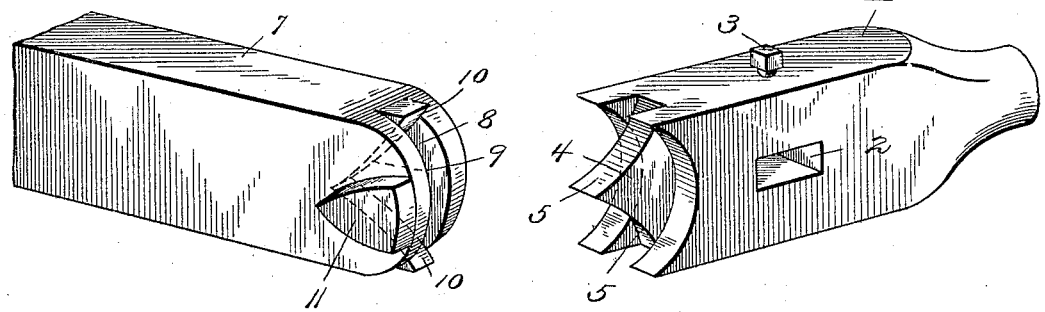
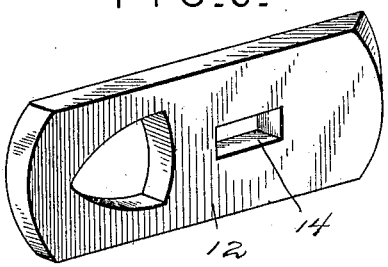
Witnesses
Harry L. Amer.
L. M. Graves.
Inventor,
Nelson Moore,
by John Wedderburn
Attorney

UNITED STATES PATENT OFFICE.

NELSON MOORE, OF BUTTE, MONTANA.

NON-FRICTION JOINT.

SPECIFICATION forming part of Letters Patent No. 576,221, dated February 2, 1897.

Application filed July 18, 1896. Serial No. 599,659. (No model.)

*To all whom it may concern:*

Be it known that I, NELSON MOORE, a citizen of the United States, residing at Butte city, in the county of Silver Bow and State of Montana, have invented certain new and useful Improvements in Non-Friction Joints; and I do hereby declare the following to be a full, clear, and exact description of the invention, such as will enable others skilled in the art to which it appertains to make and use the same.

My invention relates to non-friction joints.

The joint between the eccentric of an engine and the rod connecting the slide-valve with said eccentric, it is well known, provides for a movement between the parts through a very small arc. The joints now employed between two such parts require constant and frequent lubrication and are apt to wear out within a short time. By my invention I propose to obviate these objections and difficulties and to provide a joint in which friction is reduced to a minimum, in which lubrication is not required, and which will last for an indefinite time.

The invention consists of two bars, rods, or other devices between which a pivotal joint is to be made, one of said bars being formed with a V-shaped extension narrower than the main part of said bar and the other bar having a V-shaped recess in its end into which said V-shaped extension is adapted to fit, the sides of said recess lying at a greater angle one to the other than the sides of the V-shaped extension. I also secure to or form integral with the outer sides of the bar containing the V-shaped recess triangular lugs having outwardly-curved sides and having their apices in a direct line with the apex of said triangular recess, and clamping-plates adapted to be secured to the sides of both of said bars provided with triangular slots or openings therein of larger dimensions than said lugs and into which said lugs are adapted to fit.

The invention also consists in other details of construction and combinations of parts, which will be hereinafter more fully described and claimed.

In the drawings forming part of this specification, Figure 1 represents a perspective view of the adjacent ends of two bars provided with my improved non-friction joint between them. Fig. 2 is a longitudinal section through the same. Fig. 3 is a detail perspective view of one of said bars. Fig 4 is a similar view of the other of said bars. Fig. 5 is a similar view of one of the clamping-plates.

Like reference-numerals indicate like parts in the different views.

The bar 1, which may be a pitman, crank, or other operative part of a piece of machinery, is formed with a transverse slot 2 therein, into which projects a securing screw or bolt 3 and has its outer end formed with a V-shaped extension 4, narrower than the main part of said bar. The outer end of said bar, on each side of the extension 4, is cut away, as shown, upon a concave curve, forming shoulders 5 5 upon the forward end of said bar and lips 6 6 upon the upper and lower sides of said bar. The other bar, 7, which may be any other of the operative parts of a piece of machinery, is provided with a V-shaped recess 8 in its outer end whose edges 9 9 lie at a greater angle to one another than the edges of the V-shaped extension 4 on the bar 1. The outer end of the bar 7 is also curved, as clearly shown, and the upper and lower sides thereof are formed with lips or projections 10 10. Upon the sides of the bar 7 are formed triangular lugs 11 11, having slightly-curved convex sides, and whose apices lie in a direct line with the apex of the V-shaped recess 8. Fitting upon the outer sides of both of the parts 1 and 7 are clamping-plates 12 12, provided with rectangular slots 13 therein, which register with the slot 2 in the bar 1 and are adapted to be held in place against said bar by means of a key 13, passing through said alined slots. The said plates are further formed with triangular slots or openings 14 14, in which the lugs 11 fit, the sides of said slots being slightly concave and lying at a greater angle to one another than the sides of said lug. The said plates are adapted to fit within recesses in the sides of the bars 1 and 7 to prevent lateral displacement thereof, and are securely fastened by means of the key 13 and the bolt or screw 3.

When the parts described are in their assembled positions, the extension 4 of the bar 1 fits within the recess 8 in the bar 7, with the curved ends of said bar 7 slightly separated from the shoulder 5 and with the lips or projections 10 fitting between the lips 6 6. The apices of the lugs 10 10 fit within the apices of the triangular openings 14 in the plates 12, so that knife-edged pivot-points which are in line with one another are formed between the two bars 1 and 7. A free movement of the two bars is permitted through a small arc, friction between the parts is reduced to a minimum, and lubrication is therefore unnecessary.

Having now described my invention, what I claim as new, and desire to secure by Letters Patent, is—

1. In a device of the character set forth, the combination with a pitman or other operative part of a piece of machinery having a V-shaped extension at one end, of a second operative part having a V-shaped recess in its outer end into which said extension is adapted to fit and whose edges lie at a greater angle to one another than the edges of said extension, triangular lugs upon the outer sides of the part containing said recess, and clamping-plates adapted to fit over said parts and provided with triangular-shaped openings in which said lugs are adapted to fit and move, substantially as and for the purpose described.

2. In a device of the character set forth, the combination with a pitman or other operative part of a piece of machinery having a V-shaped extension at one end, of a second operative part having a V-shaped recess in its outer end into which said extension is adapted to fit and whose edges lie at a greater angle to one another than the edges of said extension, triangular lugs upon the outer sides of the part containing said recess whose apices are in line with the apex of said V-shaped recess, and clamping-plates adapted to be secured to the sides of said parts, having triangular slots or openings therein within which said lugs are adapted to fit and move, and whose sides lie at a greater angle to one another than the sides of said lugs, substantially as and for the purpose described.

3. In a device of the character set forth, the combination with a pitman or other operative part of a piece of machinery having a transverse slot therein, a V-shaped extension upon its forward end and shoulders having concaved faces upon each side of said extension, of a second operative part having a V-shaped recess in its outer end in which said extension is adapted to fit, whose edges lie at a greater angle to one another than the edges of said extension and said part being formed with a rounded end adapted to bear against said shoulder, triangular-shaped lugs upon the outside of said part whose apices are in line with the apex of said triangular recess, clamping-plates upon the sides of said parts, having rectangular slots therein which register with the transverse slot in said pitman and having triangular slots or openings in which said lugs are adapted to fit and move and whose sides lie at a greater angle to one another than the sides of said lugs, and a key fitting the alined slots in said plates and pitman, substantially as and for the purpose described.

In testimony whereof I have signed this specification in the presence of two subscribing witnesses.

NELSON MOORE.

Witnesses:
O. W. WALKER,
R. C. ROBINSON.